April 18, 1961  G. M. NEUMANN  2,980,208
FILTER ELEMENT FOR EXTREMELY FINE DUST
Filed May 21, 1957  2 Sheets-Sheet 1
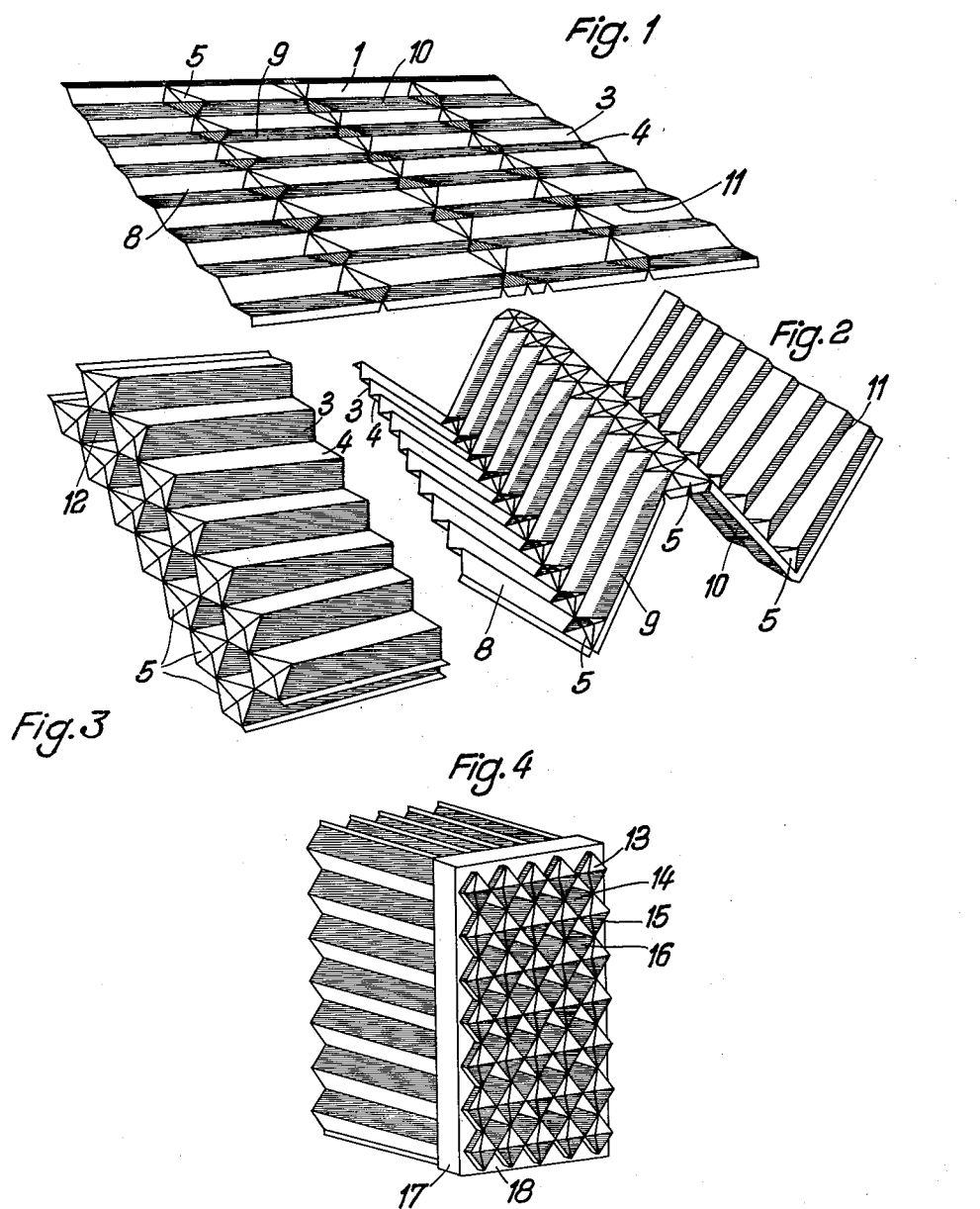

April 18, 1961 G. M. NEUMANN 2,980,208
FILTER ELEMENT FOR EXTREMELY FINE DUST
Filed May 21, 1957 2 Sheets-Sheet 2

Inventor:
Gerhard Max Neumann

2,980,208

FILTER ELEMENT FOR EXTREMELY FINE DUST

Gerhard Max Neumann, Berlin-Friedenau, Germany, assignor to Delbag-Luftfilter G.m.b.H., Berlin-Halensee, Germany, a limited liability company of Germany Filed May 21, 1957, Ser. No. 660,624

3 Claims. (Cl. 183—71)

The invention relates to a filter element to be fitted in frames of air filters for separating extremely fine dust Such filter elements for separating extremely fine dust commonly take the form of bag filters, to achieve a maximum of filter area within a comparatively small volume and a minimum of frontal area. For this purpose, filters have previously been proposed in which the paper generally used as filtering material is folded zig-zag over a special holding or supporting means and the resulting filter element set in a frame and secured. Such supporting means may be of a form in which a frame member is fitted at a spacing corresponding to the depth of the filter element with rows of supporting wires over which a strip of filter material is laid zig-zag fashion. Another known type of supporting device consists of a preferably wooden casing in which, in place of wires, wooden strips of rectangular cross-section are so arranged that the filter material passed around them will follow a labyrinthine path. In that case, either a single strip of filter material may be used, or else several bands of filter material may be stretched on the strips. To avoid deformation of the resulting filter pockets, it is necessary for these to be provided with supplementary supporting members, for example in the form of springs, serving to hold the pockets in shape and thus ensure uniform flow resistance and passage of air. If such supporting members are not provided in known pocket filters, it is possible that the walls of the individual pockets may be blown aside by the stream of air, so that the surfaces of a pocket are in contact with each other, thus withdrawing much of the filter area from effective filtration. Add to this that the mounting devices and other supporting means involve an additional expense both in the manufacture and in the installation of the filter. When a pocket filter set in such a frame is worn out, the entire frame must be dismantled for insertion of a fresh strip of filter material.

In the manufacture and assembly of such known pocket filters, then, a considerable expenditure of materials and labor has been required, and this expense has been unavoidable when such pocket filters were needed for the sake of their filtration effect.

In the art of folding and pleating, a great many different ways of folding a strip are known. With the aid of such known techniques, filter elements have previously been developed that consist of a single sheet of filter material, for example paper, rectangular in shape and folded in two directions perpendicular to each other, first zig-zag fashion throughout their length and then accordion-fashion transversely at intervals corresponding to the particular depth of filter element required.

Such filters have been known for use on liquids, in particular lubricants, for example in combustion engines. Such filters consist of filter elements folded into a prism shape after the manner of a bellows. The edges of these filters are fixed in a housing in such manner that the liquid to be filtered passes into the interior of the filter element formed by the bellows folding, and, after passing through the folded sheet of filter material, enters an outer chamber enclosed by the wall of the housing, whence it is withdrawn in clean condition.

Other known filters for liquids or gases likewise consist of sheets of filter material creased lengthwise and crosswise, but brought together circularly to form a cylindrical filter element. Such cylindrical filter elements are arranged singly or multiply in a cylindrical housing. The medium to be filtered in such filters passes from the interior of the rolled filter element through the folded filtering sheet to the outside.

It has now been discovered that the disadvantages affecting known folded and pocket filters may be avoided if a sheet of filter material folded in two directions perpendicular to each other, first zig-zag fashion and then accordion-fashion, is folded together in such manner that the primary zig-zag folds of successive panels are folded through 90° from the initial position so that their creases rest against each other like a mirror image, and their faces form square honeycomb cells having their ends closed on the upstream or downstream side in alternate rows. This method of folding a sheet of filter material of suitable size produces a folded element corresponding in cross section to the open frame area and subdivided honeycomb-fashion.

The filter element constructed according to the invention has substantial advantages, both over the so-called bag filters heretofore employed and over the known filter elements produced by double folding for liquid filters. In the first place, construction of a folded filter according to the invention affords the advantage of accommodating a large effective filter area within a comparatively small cross-section of flow, so that filtering action can be considerably increased over known filter elements. Thus it is possible, for example, with a folded element 30 to 50 mm. in depth, to accommodate an effective filter area of from 3 to 5 sq. m. within a frontal area of 0.25 sq. m. With a fold depth of about 250 mm., the same frontal area will accommodate an effective filter area of 10 sq. m. No such concentration of effective filter area relative to cross section of flow has been achieved in the case of previously known pocket filters.

Another advantage of the filter according to the invention consists in that, owing to the honeycomb-like subdivision of the filter element as a result of the method of folding, great natural rigidity is achieved, firstly eliminating the supplementary supporting means required for other folded constructions, and secondly rendering the folded element resistant to mechanical stresses, so that the filter can be mechanically cleaned by blowing through or shaking without impairing its serviceability. This high degree of resistance to mechanical stress is due solely to the honeycomb-like structure achieved by the method of folding according to the invention. Special sealing of the several cells from each other, as required in known filters, is likewise unnecessary for filter elements constructed according to the invention.

The honeycomb-like subdivision of the filter elements according to the invention also provides favorable aerodynamic conditions, inasmuch as the passage of air takes place in ideally rectilinear incidence upon the filter. The honeycomb-like subdivision has the further advantage that deposition of dust is uniformly distributed over the entire filter area, so that there is no accumulation of dust in certain isolated parts of the filter during operation. All parts of the filter area accordingly have approximately equal specific air resistance and conditions of load throughout the entire period of operation.

In the event that the filter material to be used does not in itself possess the resistance to deformation required for creasing, such filter material is placed, according to the invention, between sheets of known material on either side to serve as a supporting layer and having the requisite rigidity, for example a mesh fabric or the like, and then folded together with the supporting layers into a filter element according to the invention.

In further elaboration of the idea of the invention, the folded filter element may be attached airtight at least one end to the interior edge of the filter frame by molding or cementing it in. Preferably, the interior edge of the filter frame may have a zig-zag shape matching the outline of the filter element so as to fit the latter exactly. A perfectly airtight closure is then obtained by molding or cementing.

Since, in such filters for separating extremely fine dust, it is often necessary for the main filter to be preceded by a prefilter, a prefilter composed of a battery of filter candles may according to the invention be insertably provided in the honeycomb-like folded element.

Manufacture of the filter element according to the invention is simplified in the extreme because no troublesome installation or assembly operations are required. The strip of filter material, prepared by proper folding and creasing, will of itself fall together into the finished shape, while the proportion of surface to volume of the filter element can be varied within certain limits by folding it together more or less closely.

The device according to the invention will now be more fully described with reference to the accompanying drawings, but it should be understood that many changes in the details may be made without departing from the spirit of the invention, the embodiment shown being given by way of illustration and not of limitation.

In the drawings,

Fig. 1 shows a sheet of filter material with pre-ruled or pre-scored creases.

Fig. 2 shows the sheet of Fig. 1 in half-assembled position.

Fig. 3 shows the sheet of Figs. 1 and 2 in final assembled position.

Figs. 4, 5 and 6 show a filter element arranged in a frame, in perspective, side and front view respectively

Figure 5:
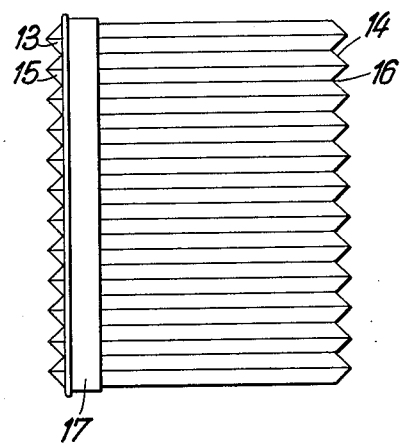

As shown in Fig. 1, a sheet 1 of filter material is divided into parallel, zig-zag folds with faces 3, 4. At intervals, transverse creases 5 defining lozenge-shaped areas are provided, subdividing the sheet perpendicular to the direction of folding into panels 8, 9, 10, 11 corresponding to the depth of the filter. The rows of transverse creasing 5 bounding the panels are staggered relative to each other by the width of a face 3 or 4. In this way the sheet 1 can be assembled like an accordion as shown in Fig. 2, until the convex folded edges of neighboring panels touch, the creasings 5 forming the ends of the quadrangular honeycomb cells formed by the faces 3, 4.

Figure 6:
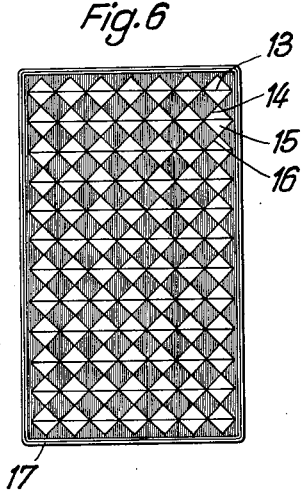
Figure 6A:
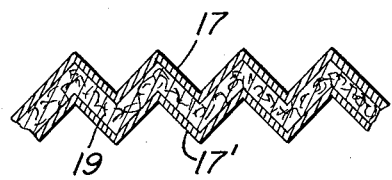
Fig. 6a shows an end view of a filter sheet with supporting layers.

After complete assembly, a honeycomb-like element as represented in Fig. 3 is obtained, one row of cells being closed in front at 5 and open in back, and the next row of cells being open in front at 12 and closed in back. Fig. 4 shows a filter element according to the invention, mounted at one end in a frame 17. The frame 17 has an inside border 18, of zig-zag outline to match the filter element, to which the latter is sealed by molding or cementing. The filter element of Fig. 4 has first a row of cells 13 closed in front and open in back, then a row of cells 14 open in front and closed in back, then another row of cells 15 closed in front and open in back, and then another row of cells 16 open in front and closed in back, and so on. Figs. 5 and 6 show a side and front view, respectively, of the filter element with frame 17, the rows of cells 13, 15 and 14, 16 closed respectively in front and in back being identified in each instance. As seen in Fig. 6a supporting layers 17 and 17' of thin porous fabric are provided for the filter material 19.

What I claim is:

1. A filter element to be fitted in frames of air filters for separating extremely fine dust, comprising a single rectangular sheet of filter material creased first lengthwise zig-zag fashion to divide the sheet into a plurality of equal folds, then creased transversely along a plurality of equally spaced fold lines to define panels of equal length, said panels then folded transversely accordion-fashion each through 90° from their initial position at intervals, said panels forming after the transverse folding a plurality of opposed convex edges extending the length of said panels, said convex edges contacting their respective opposites throughout like a mirror image, the faces of the panels forming quadrangular honeycomb cells having their ends closed on the upstream and downstream side in alternate rows, whereby said panels are rigidly supported by one another and are made stress-resistant in a direction transverse to said edges.

2. In a filter element according to claim 1, a filter material lacking the resistance to deformation required for creasing, wherein this material is flanked on either side by a supporting layer of other material and is creased and folded jointly therewith.

3. In a filter element according to claim 1, at least one end in a frame whose inner border has a zig-zag shape matching the outline of the filter element, and made airtight thereto by known means.

References Cited in the file of this patent

UNITED STATES PATENTS

| | | |
|---|---|---|
| 1,708,065 | Jordahl et al. | Apr. 9, 1929 |
| 2,515,894 | Polk | July 18, 1950 |
| 2,683,537 | Dobrolet | July 13, 1954 |
| 2,731,108 | Kennedy | Jan. 17, 1956 |

FOREIGN PATENTS

| | | |
|---|---|---|
| 329,099 | Great Britain | May 15, 1930 |